R. Stuckwisch.
Brick Machine.
Nº 96,996. Patented Nov. 16, 1869.
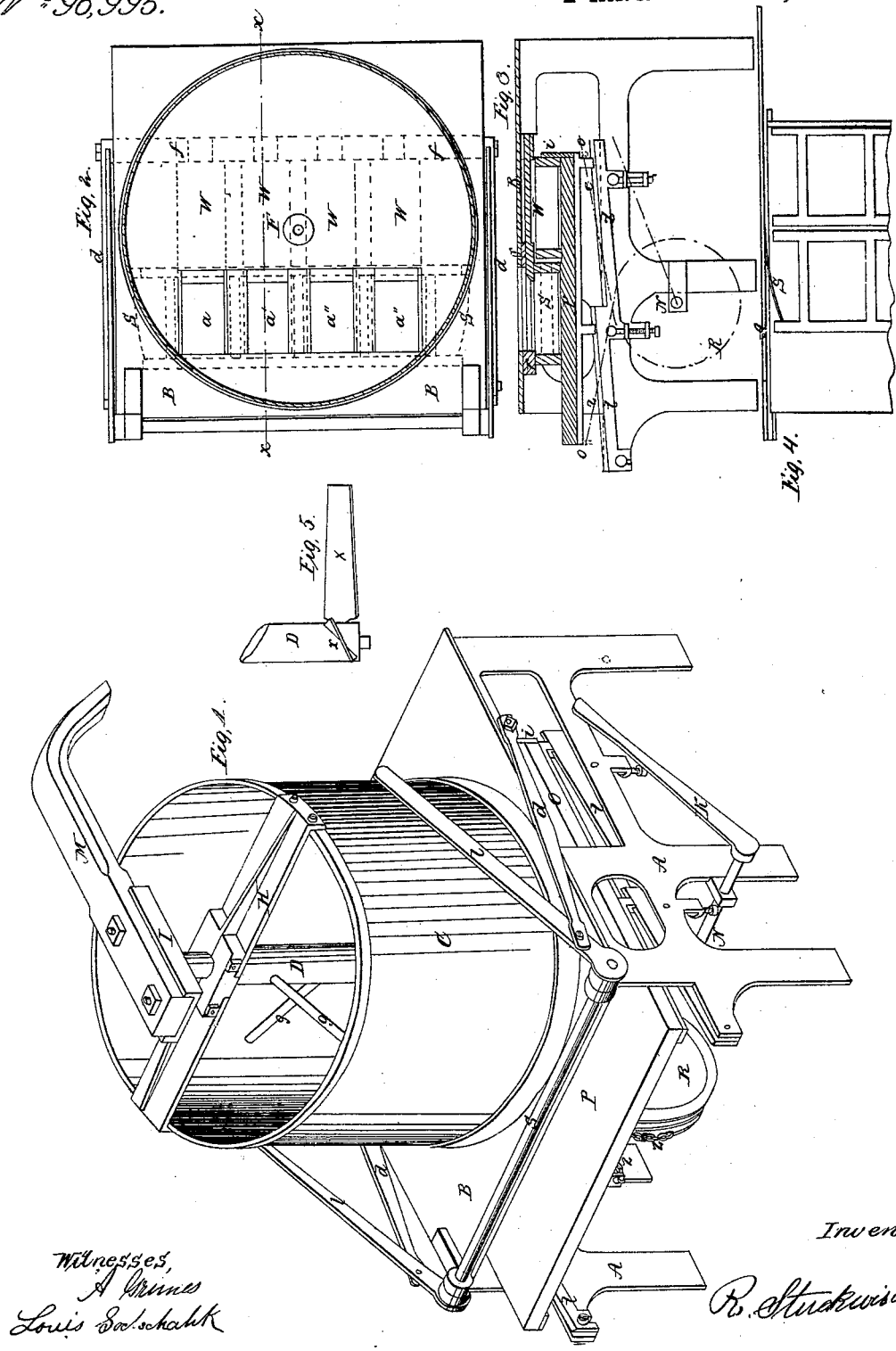

United States Patent Office.

R. STUCKWISCH, OF TERRE HAUTE, INDIANA.

Letters Patent No. 96,995, dated November 16, 1869.

IMPROVEMENT IN BRICK-MACHINES.

The Schedule referred to in these Letters Patent and making part of the same.

Be it known that I, R. STUCKWISCH, of the city of Terre Haute, Vigo county, in the State of Indiana, have invented a new and useful Improvement on a Brick-Machine; and I do hereby declare that the following is a full, clear, and exact description of the construction and operation of the same, reference being had to the annexed drawings, making a part of this specification, in which—

Figure 1 is an isometrical view of my machine.

Figure 2 is a top view of the drum of the perforated plate.

Figure 3 is a vertical section through $x\, x$, fig. 2.

Figure 4 is a part of the top view of the frame and platform, showing the position of the moulds and springs.

Figure 5 is a part of the upright shaft, showing the shape of the paddles used for pressing the mud into the moulds.

The object of my invention (machine) is to make the brick leave the moulds in a more perfect form than heretofore accomplished.

To enable others skilled in the art to make and use my (machine) invention, I will describe its construction and operation.

Upon two equal frames, A A, fig. 1, rests the plate B, with the drum C cast on, which latter is to receive the mud, and in the centre of the drum is the upright shaft D, with its grinders $q\, q$, and the paddles $x\, x$, fig. 5.

This shaft is supported by the centre F, fig. 2, and a cross-beam, H, and provided on the top with the jaws I I, fig. 1, for the reception of the sweep M, to which a horse is hitched.

Close above the plate B, on the shaft D, which carries the grinders, is arranged a cross of paddles, the shape of which is shown in fig. 5, $x\, x$. They form inclined planes, becoming steeper as they approach the centre, intended to work the mud away from the same, and subject it (the mud) to greater pressure downward over the openings above the moulds.

Inside of the drum C, fig. 2, are four, more or less, rectangular openings, $a\, a'\, a''\, a'''$, on the under side of which is fastened a frame, $r\, r$, fig. 3, forming the guides for four (more or less) slides, or strikers, $w\, w\, w\, w$, fig. 2, for the purpose of striking across the moulds when full and completely shutting the openings.

These strikers are all attached to the traverse rod $t\, t$, figs. 1, 2, and 3, and extend beyond the edge of the plate B, where the connecting-rods $d\, d$, figs. 1 and 2, are attached to the same.

These rods $d\, d$, fig. 1, are also connected with the two levers, $l\, l$, fig. 1, which are keyed to the shaft $s$, by which levers the strikers may be moved either way, and the openings $a\, a'\, a''\, a'''$, fig. 2, shut and open at pleasure.

The platform P upon which the moulds are placed to be filled and pressed, (the moulds being placed in the rear of the openings, inside of the drum C,) is supported by the Z-shaped slides $t\, t$, figs. 1 and 3, adjustably bolted to the frame, so they act as an inclined plane, intended to raise the platform when worked to the left, and make its descent, when worked or moved to the right, by means of the chains $z\, z$, (indicated in fig. 3,) the pulley R, and the lever K, fig. 1.

There are also two springs, an essential part of my machine—$s$, fig. 4, and $l\, m$, dotted lines, figs. 2 and 3, attached to the frames—very efficiently adapted for placing the moulds at the proper place under the openings $a\, a'\, a''\, a'''$.

The working of the machine is as follows:

The horse on the sweep M being in motion, and the mud ready for the moulds, (the latter well sanded,) the platform P is, by the lever, moved under the drum C as far as a stop will permit. Then a mould is introduced through the opening O, fig. 1, in the frame on the platform, this part of the same being dressed down one-quarter of an inch lower than the part directly under the opening $a$.

The mould will rest against the back $i$, figs. 1 and 3, of the platform.

When the latter is moved to the left by the lever K, the same will descend on the slides $t\, t$, leaving the moulds perfectly free.

The back $i$ will push it under the openings, when the springs will be compressed till they pass the left ends of the moulds, and upon reversing the motion of the platform, these springs will prevent the mould from following.

The former, rising up under it, will press the mould firmly against the striker-frame $r\, r$, whereupon the strikers are thrown to the left.

The communication with the drum being arranged, and the mould filled and pressed, the strikers are passed over the filled moulds, shutting off the communication with the mud in the drum.

In the meantime another mould is inserted at O, fig. 1, which will push the first one out, and take its place.

It is evident, that as soon as the filled mould is moved to the left, it descends at the same time the adhesion of the mud to the strikers is broken, and, consequently, the form of the moulded brick is not altered by the adhesive traction, as it would be if the mould communicated with the mud above, or was forced from under the openings or strikers, without lowering the platform.

The moulds are placed in ready position for the mud, before the same begins to enter.

What I claim as new, and desire to secure by Letters Patent, is—

1. The adjustable guides $t\ t$, constructed substantially as and for the purpose set forth.

2. The platform P, in combination with guides $t\ t$, when said guides are constructed and arranged substantially as specified.

3. The parts herein mentioned, when all are constructed, combined, and arranged together in a brick-machine, as and for the purpose described.

R. STUCKWISCH.

Witnesses:
   A. GRIMES,
   F. GODSCHALCK.